United States Patent [19]
Cheeseboro

[11] 4,302,832
[45] Nov. 24, 1981

[54] RADIAL-TRACKING PROGRAMMABLE RECORD PLAYER WITH RECORD HANDLING DOOR MECHANISM

[76] Inventor: Robert G. Cheeseboro, 3650 Somerset Dr., Los Angeles, Calif. 90016

[21] Appl. No.: 164,922

[22] Filed: Jul. 1, 1980

Related U.S. Application Data

[62] Division of Ser. No. 951,563, Oct. 16, 1978, Pat. No. 4,222,574, which is a division of Ser. No. 778,027, Mar. 16, 1977, Pat. No. 4,121,836.

[51] Int. Cl.³ .............................................. G11B 25/04
[52] U.S. Cl. ..................................................... 369/77
[58] Field of Search ................... 274/9 B, 10 R, 10 E; 360/99, 86, 97; 369/77, 78, 79

[56] References Cited

U.S. PATENT DOCUMENTS

| | | | |
|---|---|---|---|
| 2,657,061 | 10/1953 | Sperber | 274/10 R |
| 2,670,210 | 2/1954 | Thompson | 274/9 B |
| 2,905,475 | 9/1959 | Cheeseboro | 274/9 B |
| 3,658,347 | 4/1972 | Cheeseboro | 274/9 B |
| 3,815,150 | 6/1974 | Stoddard et al. | 360/97 |
| 4,113,262 | 9/1978 | DeStephanis | 274/9 B |
| 4,124,866 | 11/1978 | Coleman | 274/9 B |

*Primary Examiner*—John W. Shepperd
*Attorney, Agent, or Firm*—Christie, Parker & Hale

[57] ABSTRACT

There is described, among other things, a novel record player of the slot-loading type in which a phonograph record disc is supported in a playing position on a turntable rotatably driveable at a selected speed about an axis. The disc, in its playing position, is engageable with a stylus supported by a transducer cartridge held in a carriage which is movable along a line radially of the turntable above the turntable in response to tracking engagement of the stylus in the spiral groove of the phonograph record disc. The turntable is movable along such axis into and out of a playing position thereof, and the turntable and the carriage are disposed in an enclosing housing. According to this invention, the housing includes a door which is closed when the turntable is in its playing position. The door includes record support members, accessible in an open position of the door, for receiving and supporting a record and for disposing a supported record between the turntable and the carriage coaxially above the turntable when the door is in its closed position. The record-supporting members are positionally adjustable for receiving and supporting at different times records of different diameters. The record support elements are power driven between their various adjusted positions. The drive mechanism associated with the record support elements is operable when the door is in its open position. Also, a power mechanism is provided for moving the door between its open and closed positions.

5 Claims, 9 Drawing Figures

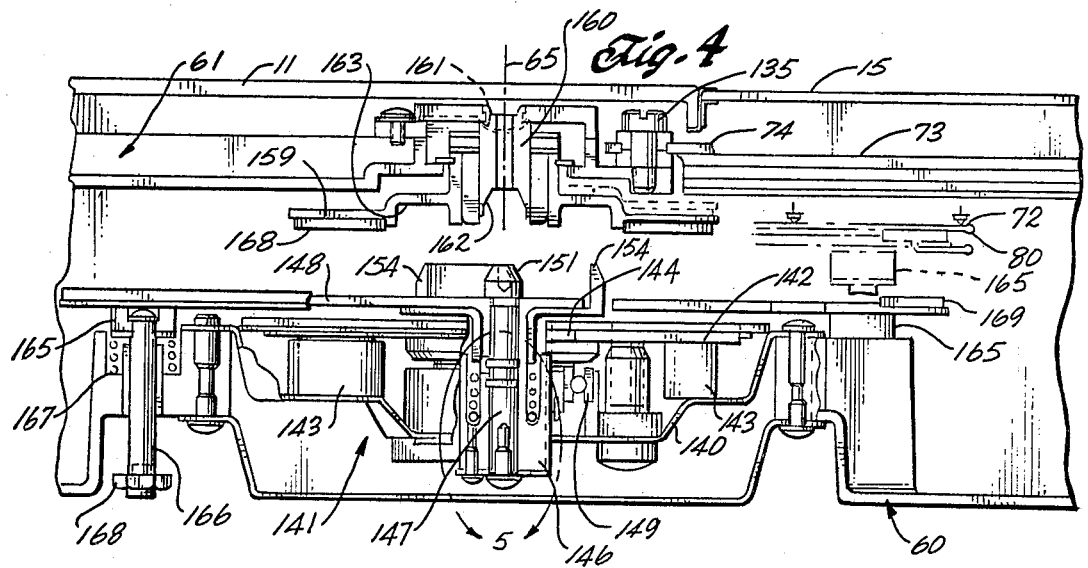

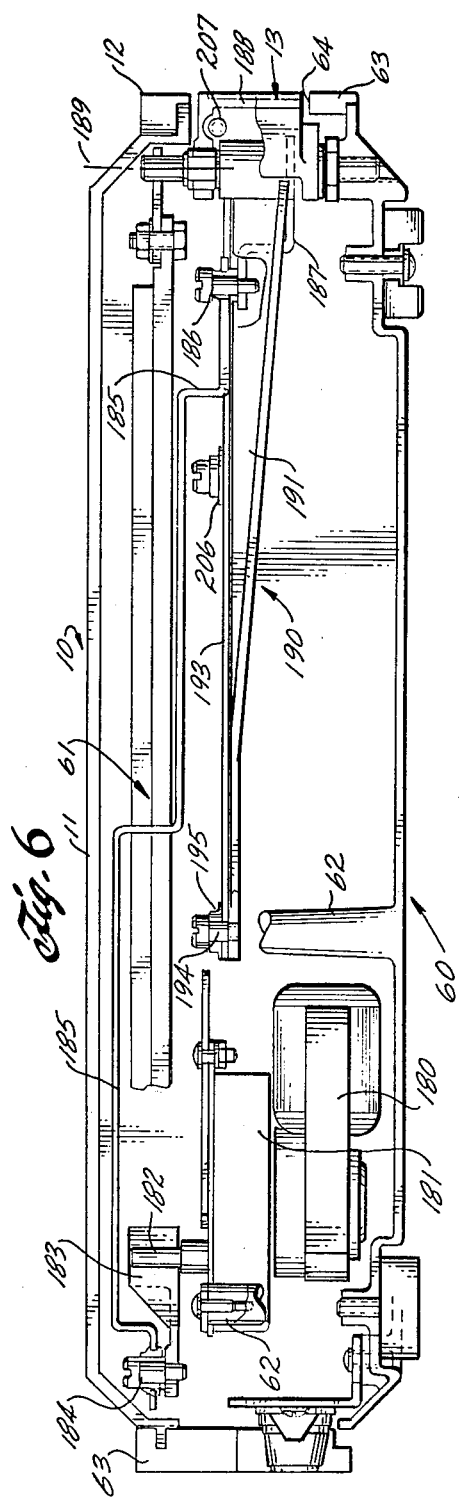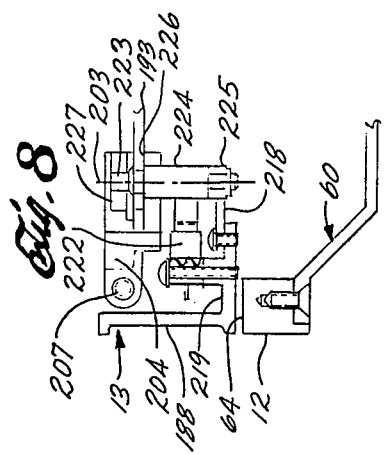

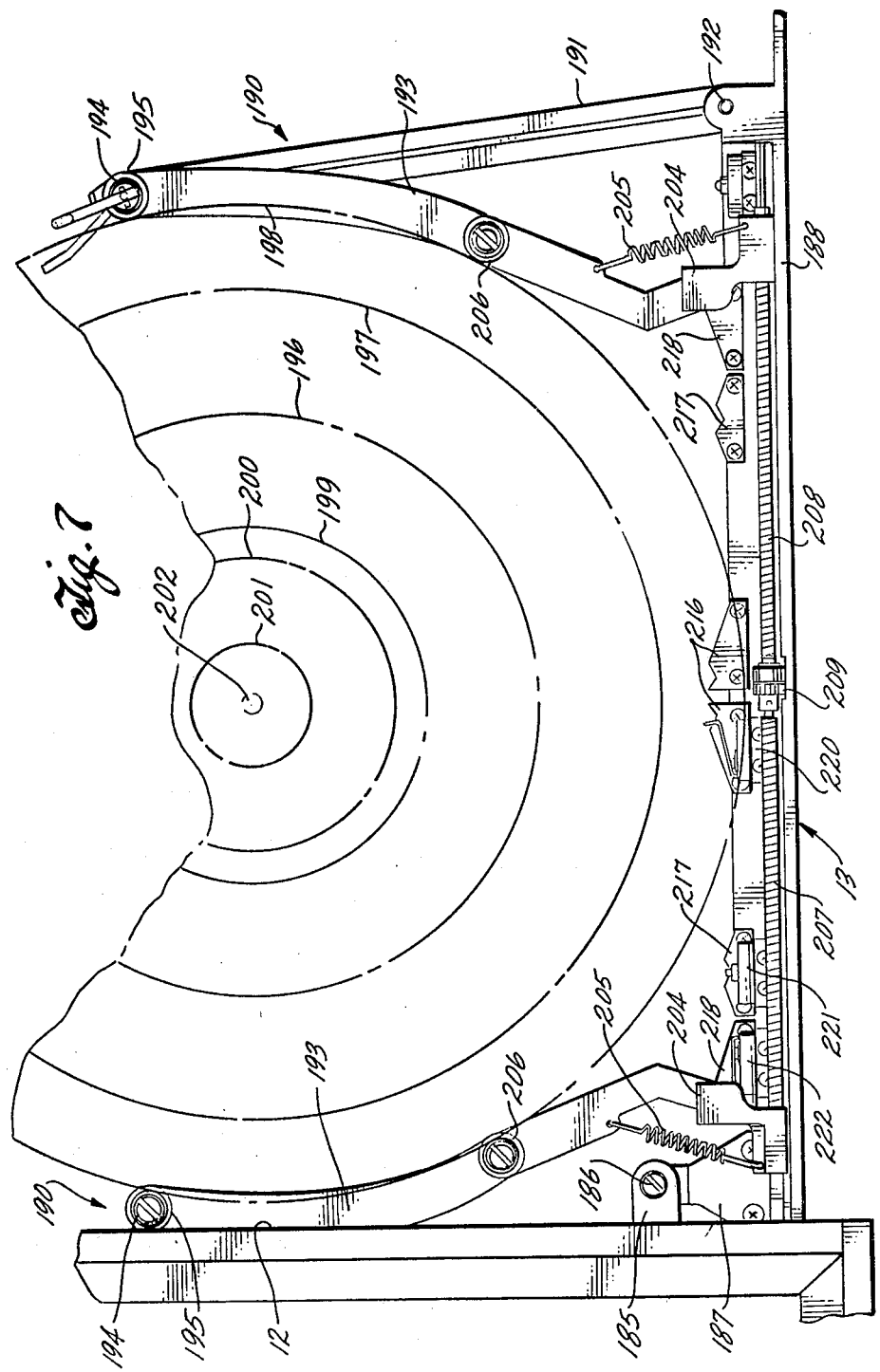

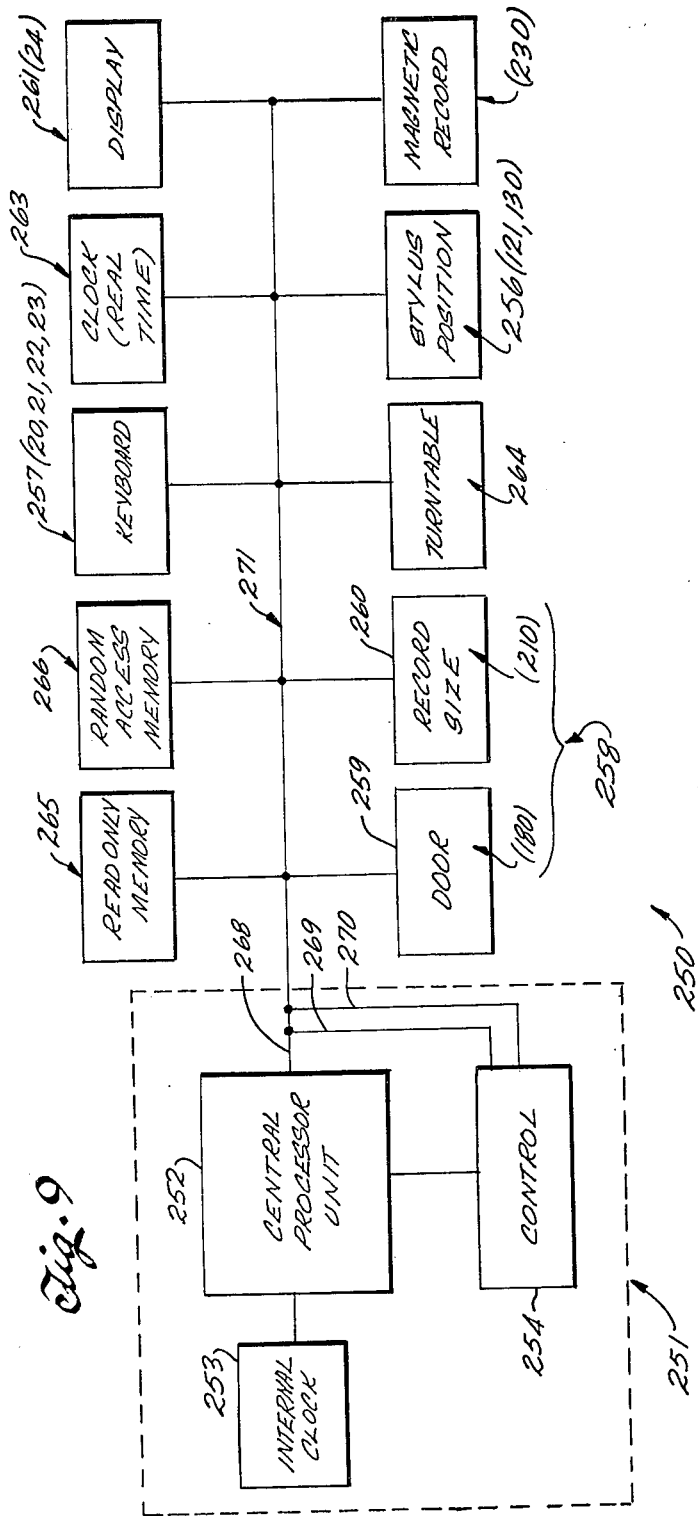

RADIAL-TRACKING PROGRAMMABLE RECORD PLAYER WITH RECORD HANDLING DOOR MECHANISM

CROSS REFERENCE TO RELATED APPLICATIONS

This is a division of application Ser. No. 951,563, filed Oct. 16, 1978 now U.S. Pat. No. 4,222,574 as a division of application Ser. No. 778,027 filed Mar. 16, 1977, now U.S. Pat. No. 4,121,836.

BACKGROUND OF THE INVENTION

1. Field of the Invention

This invention relates to record players, i.e., to equipment useful with a phonograph record disc to sense by a stylus, and to convert by a transducer to an electrical signal, audio information contained in the contours of the spiral groove defined in the disc. More particularly, it relates to a programmable record player in which the stylus moves across a record disc along a line radially of the disc axis of rotation and in which the transducer cartridge, to which the stylus is mounted, is carried in a novel suspension which enables substantially zero tracking force to be achieved between the stylus and the record disc and which, apart from the overall radial-tracking movement, constrains the cartridge to move without change in the tracking force only perpendicular to the disc's plane of rotation under loads imposed on the stylus by the record.

2. Review of the Prior Art

My prior U.S. Pat. No. 3,658,347 describes a record player in which a phonograph record disc, during playing of the record when a stylus is engaged in the record's spiral groove, is held captive between a driven record supporting turntable below the record and a clamp disc above the record. The stylus is carried by a transducer cartridge which is mounted in a carriage located above the record. The carriage is supported on rollers engaged in rails so disposed that the path of movement of the stylus, overall across the record, is along a line parallel to and radially of the record.

The advantages of radial-tracking record players, as compared to record players in which the stylus and the cartridge are mounted on the end of a long pivoted tone arm, is that the stylus path of movement across the record corresponds to the path of movement traversed by the cutting head of the lathe used to define the master record of which the usual commercially available record is a replica. Thus, in theory, a radial-tracking record player better reproduces the sounds defined in the contours of the walls of the spiral groove of the record.

Virtually all phonograph records now produced, regardless of size, are manufactured to reproduce stereophonic sound. In the cutting of the masters from which the records are reproduced, the cutting tool of the master cutting lathe moves in the cutting head only normal to the master disc (to produce variations in groove depth) and from side-to-side radially of the master disc (to produce local variations in the contour of the groove sidewalls defining the actual audio information); the overall spiral pattern of the groove is generated in the master disc by controlled movement of the lathe cutting head radially of the master disc's axis of rotation.

Thus, to optimally reproduce the sounds recorded in a phonograph record, a record player should limit the motions of the pickup stylus to only those motions which are experienced by the cutting tool used to cut the master disc. Also, the stylus should be mounted in the record player so that it can accommodate these limited motions without any variation in the force with which the stylus engages the record groove. The present record player accomplishes this optimum result significantly better than is the case of record players according to my prior patent, and also better than is the case in other radial-tracking record players now commercially available.

Radial-tracking record players are now commercially available and are marketed in the United States and elsewhere under the tradenames Bank & Olufsen and Rabco, among others. All of these record players mount the stylus and cartridge on the end of an elongate tone arm which is hinged at its other end for rotation of the arm at least in a plane perpendicular to the plane of rotation of a record engaged by the stylus. This is done to enable the stylus and cartridge to move vertically to follow warpage which is common in mass-produced phonograph records. Such hinging of the tone arm enables the stylus to have a freedom of motion not permitted to the cutting tool in the manufacture of the master disc; to at least this extent, these other radial-tracking record players depart from the optimum tracking characteristics described above. The present record player does not afford this additional mode of motion to the stylus and cartridge. The other radial-tracking record players mentioned above suffer from additional disadvantages which are overcome in the present record player.

SUMMARY OF THE INVENTION

This invention, as set forth in the appended claims, provides a record player of the slot-loading type in which a phonograph record disc supported in a playing position on a turntable rotatably driveable at a selected speed about an axis. The disc, when disposed in its playing position, is engageable with a stylus which is supported by a transducer cartridge held in a carriage which is movable along a line radially of the turntable above the turntable in response to tracking engagement of the stylus in the spiral groove of the disc. The turntable is movable along the axis into and out of a playing position. The turntable and the carriage are disposed in an enclosing housing. In this context, the housing includes a door which is closed when the turntable is in its playing position. The door includes means accessible in an open position of the door for receiving and supporting a record and for disposing a supported record between the turntable and the carriage coaxially above the turntable in the closed position of the door.

DESCRIPTION OF THE DRAWINGS

The above-mentioned and other features of this invention are more fully set forth in the following detailed description of the presently preferred embodiment of the record player and of alternative embodiments of certain aspects of the record player, which description is presented with reference to the accompanying drawings, wherein:

FIG. 4 is a cross-section view of the turntable, turntable drive motor and record clamp disc employed in the presently preferred record player;

FIG. 5 is an enlarged cross-section view of a portion of the structure shown in FIG. 4;

FIG. 6 is a cross-sectional elevation view, with some elements broken away, taken generally along line 6—6 in FIG. 3;

FIG. 7 is a top plan view of the door of the record player of FIG. 1 shown in its open position, and of the record support arms carried thereby;

FIG. 8 is a cross-section view taken along line 8—8 in FIG. 3; and

FIG. 9 is a simplified overall block diagram of the programmable control system for the present preferred record player.

Incorporation by Reference: The drawings and certain of the text of my previously issued U.S. Pat. Nos. 4,121,836 and 4,222,574 (identified in the foregoing Cross-reference to Related Applications) are incorporated herein by reference. The specific portions of each of these two patents which are incorporated herein by reference are as follows:

U.S. Pat. No. 4,121,836, column 5, line 51 to column 8, line 51; U.S. Pat. No. 4,222,574, column 8, line 32 to column 13, line 7, with respect to which the text of U.S. Pat. No. 4,121,836, beginning at column 9, lines 43 to column 13, line 37, may also be informative.

U.S. Pat. No. 4,121,836 particularly illustrates, describes and claims that aspect of the record player described herein involving the suspension mechanism for mounting the phonograph transducer cartridge within the structure of the record player; the cartridge has a stylus engageable in the groove of a phonograph record disc to be played in the record player.

The drawings, text and claims of U.S. Pat. No. 4,222,574 pertain to those aspects of the present record player concerning the cartridge carriage drive and position sensing mechanism which serve several functions. The drive mechanism cooperates with a support carriage for the stylus cartridge to cause a follower element, associated with the carriage, to be positively driven in such manner that the follower maintains position adjacent to the stylus cartridge but does not normally contact the carriage during play of a record. The cooperation between the follower element and the cartridge carriage includes a sensing mechanism used to control the drive which is coupled to the follower element. The drive and sensor mechanisms afford a means for determining where the stylus is at any point in time, and also for positioning the stylus at a selected point in its path of travel radially of a record so that a selected passage of the record can be played upon appropriate command. Further, the mechanisms described in this patent include a mechanism for raising and lowering the stylus out of and into engagement with a record groove, and for driving the carriage in either direction radially of the record.

DESCRIPTION OF THE ILLUSTRATED EMBODIMENTS

Figure 1:
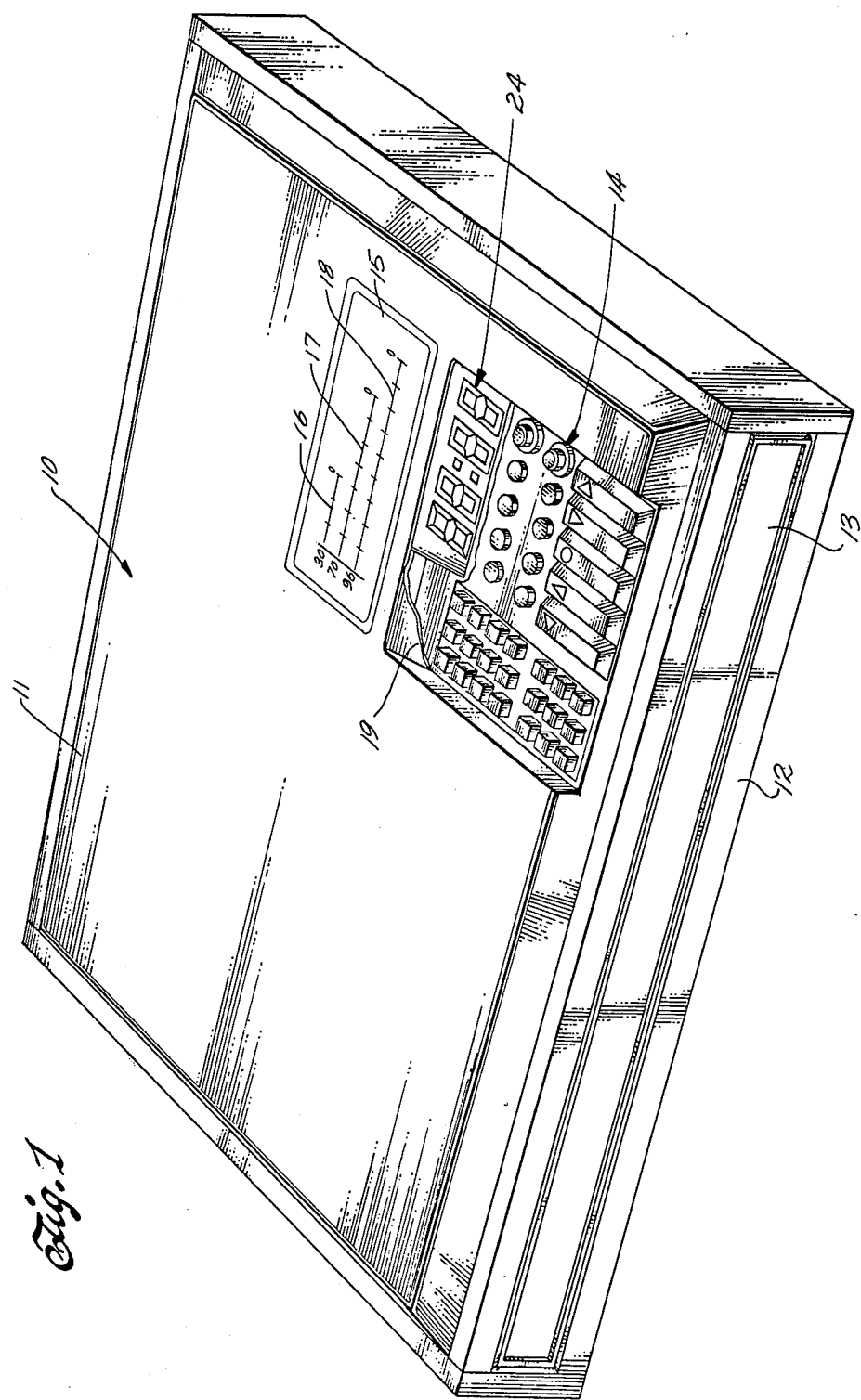
FIG. 1 is a perspective of the presently preferred record player according to this invention.

FIG. 1 is a perspective view of a progammable radial-tracking record player 10 which is the presently preferred record player according to this invention. Record player 10 has overall dimensions of 3⅛ inches high by 17 inches wide by 13 inches deep. The top of the record player is defined by a cover 11 which is normally not openable by a user during operation of the record player. Instead, access to the interior of the record player, for the purpose of inserting a phonograph thereinto, is obtained via an openable door 13 which is incorporated in the front face 12 of the record player and which is shown in its closed position in FIG. 1. Preferably the cover 11 of record player 10 is defined of a smoked plastic material which appears to resemble obsidian or polished ebony at a distance, but which, from a close viewing position, enables an observer to see into the interior of the record player.

Figure 2:
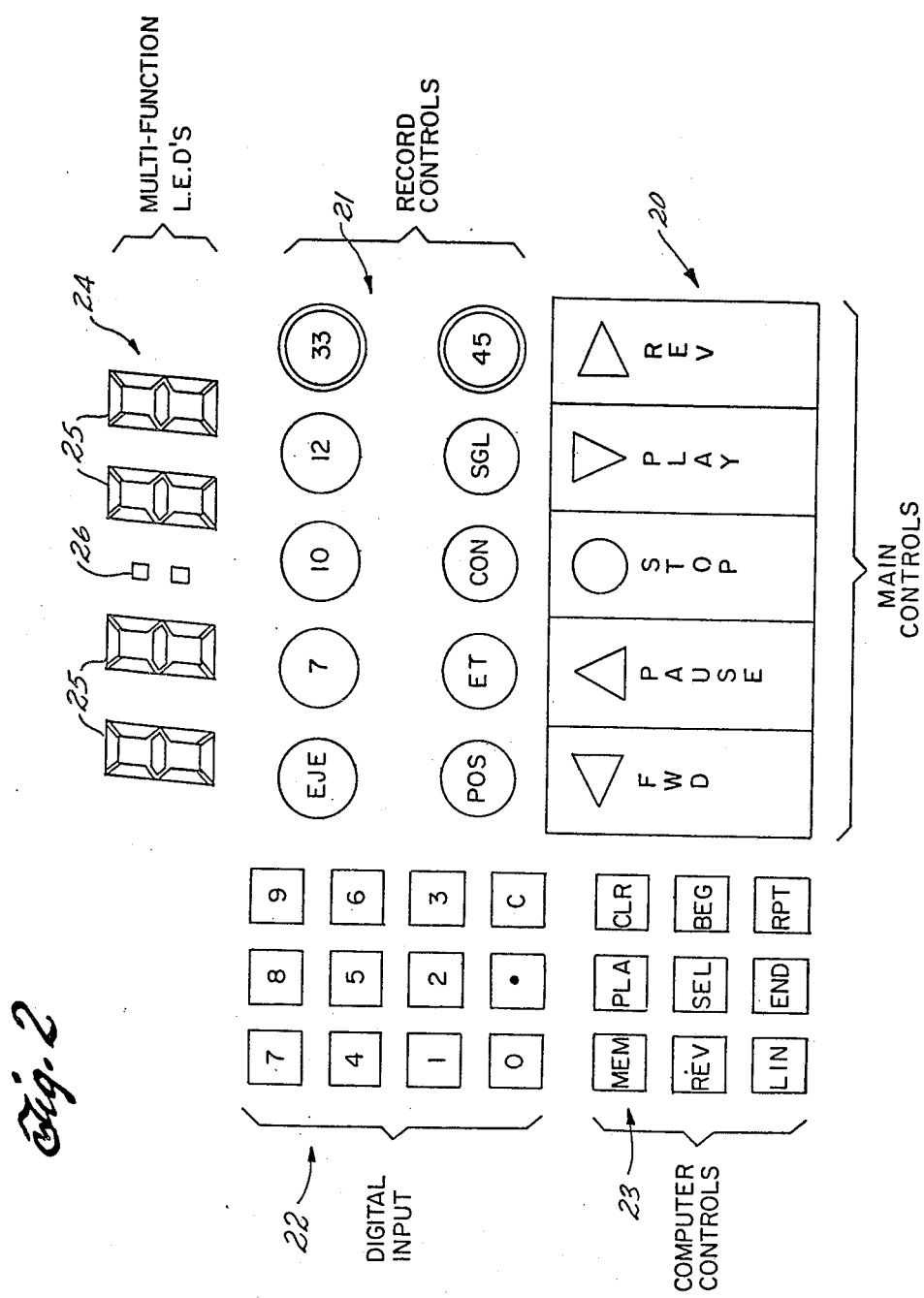
FIG. 2 is a chart showing the control and data display portion of the record player illustrated in FIG. 1.

A control and operating panel 14 is located in the lower right quadrant of the cover 11, and is shown in greater detail in FIG. 2. A transparent window 15 is provided through the cover immediately across the top of control panel 14, and is located generally above the path of movement of the stylus and its transducer cartridge radially of the axis of the turntable of the record player. The record player is constructed to play records of 7 inch, 10 inch or 12 inch diameter. Corresponding scales 16, 17 and 18 are carried by window 15 to enable the user to visually follow and determine the position of the stylus at any time across the width of the playing (audio information carrying) portion of the spiral groove of a record in the record player between the run-in and run-out portions of the groove. The relationship between the above-described externally visible features of record player 10 and its internal, normally inaccessible mechanisms will be apparent from the following description.

In the vicinity of control panel 14, the cover is recessed, as at 19, and suitable openings are provided through the bottom of the recess to enable projection into the recess of the pushbutton portions of the control command and data input switches which are all mounted on a common support in the record player below the recess. The display devices shown in FIG. 1 as part of display section 24 of control panel 14 are actually mounted below the cover, to be visible through the cover when illuminated, and this is shown by the content of FIG. 1.

As shown in FIG. 2, which is a chart showing the general organization and graphic detail of control panel 14, the control panel is functionally divided into a main control section 20, a record control section 21, a digital input section 22, a computer control section 23, and a visual display section 24. The latter section preferably is composed of four seven-segment light-emitting diode displays 25 arranged in pairs on either side of a two-element light-emitting diode 26 in which the elements are arranged in the form of a colon.

The individual controls involved in control panel 14, their functions, and the operations they control are described in articles published concerning record player 10 and appearing at (1) DESIGN NEWS, issue of Mar. 21, 1977, at pages 54 and 55, and (2) INTERFACE AGE, issue of May 1977, pages 16–27. Other aspects of the record player are described in these articles and also in the article at pages 36 and 37, DESIGN NEWS, issue of Mar. 21, 1977. Reference is made to these articles for information concerning aspects of the record player other than those aspects described in U.S. Pat. Nos. 4,121,836 and 4,222,574, as incorporated herein, or as set forth in the following descriptions. Certain of these other aspects of the record player are illustrated in part in the accompanying drawings.

Main control section 20 of the control panel includes five independently illuminated pushbuttons which are the principal control elements of the record player. The main control pertinent to the invention described and claimed herein is:

a PLAY control 30 which, when operated, causes loading door 13 to close, the turntable drive motor to be operated to lift the turntable along its axis of rotation and thereafter to be rotated at a selected speed, and to play the record either in a normal manner or as instructed by operation of other components of the control panel.

Record control section 21 of the control panel includes ten separately illuminated pushbuttons, which either implement commands or peform functions within the record player related to a particular record being played or augment the commands and functions associated with the main control section. The controls in the record control section pertinent to the invention described and claimed herein are:

an eject (EJE) button 32 which, when operated causes the stylus to be lifted from the record and traversed to a "home" position associated with the size of record then selected by button 33, 34 or 35, and causes the record loading door 13 to open and either to present the record then in the record player for access for removal from the record player or to enable a record to be loaded onto the record support arms carried by the door; if stop button 29 has not previously been operated, operation of eject (EJE) button 32 also causes the record player mechanisms to carry out the operations and functions associated with depression of STOP button 29 except for shut-off of power in the record player; and Record size pushbuttons 33, 34 and 35 corresponding to play of records of 7 inch, 10 inch and 12 inch diameter, respectively, the depression of any one of which causes the record support arms on door 13 to be positioned for support of a correspondingly sized record; operation of these buttons also defines the "home" position of the stylus above the run-in portion of the appropriately sized record immediately adjacent to its outer margin.

Fine-tuning speed control rings 42 and 43 are associated with the speed selection pushbuttons 36 and 37. These control rings are coupled to fine-tuning potentiometers 44 and 45 (see FIG. 3) to enable the user to accurately adjust the actual operating speed of the turntable.

The computer control section 23 of the control panel is composed of nine independently illuminated pushbuttons arranged in a 3×3 matrix. The controls in this section of the control panel are not germane to the invention described and claimed herein.

The principal structural elements of record player 10 are a bottom pan 60, preferably a casting, and a top frame 61, also preferably a casting. The top frame is supported on the bottom pan on suitable posts 62, one of which is shown in FIG. 6, to dispose the top frame generally horizontally parallel to the bottom pan, but closely adjacent to the underside of cover 11, thus providing a generally open space within the interior of the record player into which a record may be moved by operation of door 13. The cover 11 preferably is carried in a wooden frame 63 which defines the outer perimeter of the record player. The wooden frame is hinged to bottom pan 60 along the rear of the record player and is held in position on the bottom pan by suitable screws. Door 13 has a closed position in an opening 64 formed in the front face of the frame, as shown in FIG. 6.

Figure 3:
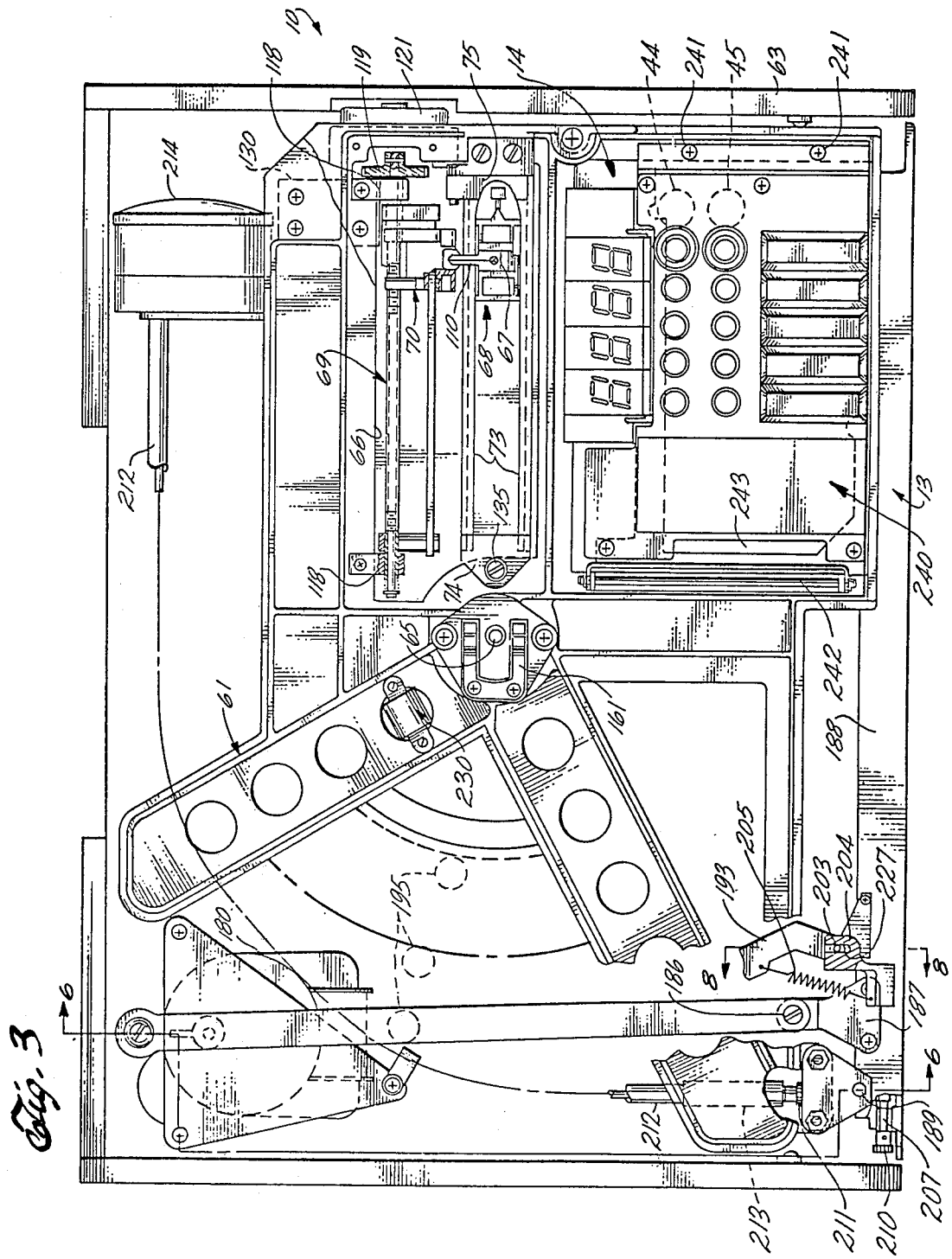
FIG. 3 is a top plan view of the record player of FIG. 1, with the cover thereof removed.

FIG. 3 is a simplified plan view, with some parts broken away and others shown in section, of the structure which is visible within the interior of record player 10 when cover 11 is opened. A major reference point of interest in the record player is the centerline, i.e., axis of rotation, 65 of a record 80 disposed in the record player. As viewed in FIG. 3, top frame 61 has an elongate opening 66 formed in it to the right of record axis 65 above control panel 14. The window 15 in cover 11 is located above this opening. The transducer cartridge and its stylus, it support suspension and carriage, the support tracks for the cartridge carriage, and the cartridge positioning and positioning sensing mechanisms are all located in top frame openings 66; see FIG. 3. The stylus transducer cartridge is indicated generally in FIG. 3 at 67, the cartridge suspension and carriage at 68, the cartridge positioning and position-sensing mechanism at 69, and the follower member of the positioning and position-sensing mechanism at 70.

The drawings of U.S. Pat. No. 4,121,836 and the descriptions of that patent beginning at column 5, line 51, through column 8, line 51, may usefully be referred to at this point for a detailed description of the transducer cartridge, its support mechanism, and the cartridge carriage aspects of record player 10. Also, the drawings of U.S. Pat. No. 4,222,574 and the text of such patent, beginning at column 8, line 32 through column 32, line 17, may usefully be referred to for descriptions of the follower mechanism associated with the cartridge carriage which is operable for following movement of the cartridge radially of a record being played, for raising and lowering the cartridge relative to the record being played, and for moving the cartridge radially of the record as required or appropriate in response to operation commands given to the record player through the agency of control panel 14. As noted above, my prior U.S. Pat. No. 3,658,347 describes a radial-tracking record player in which the record, during play, is held clamped between a rotatable turntable, located below the record, and a rotatable clamp disc mounted coaxially of the turntable above the record. The turntable is movable axially along its axis of rotation to provide a space between the turntable and the clamp disc into which the record may be inserted to thereafter be gripped between the turntable and the clamp disc. My prior patent describes a screw mechanism, coupled between the turntable and the turntable drive motor, for causing the turntable both to be driven along its axis toward and away from the clamp disc and, when disposed in its playing position, to be rotated at a desired speed as determined by the operational rate of the turntable drive motor as coupled to the turntable. In the prior patent, the turntable drive mechanism includes a printed circuit motor which has its axis displaced from that of the turntable and coupled via a capstan to an idler having its axis of rotation coincident with that of the turntable. The screw mechanism is coupled between the idler hub and the turntable. Reference is made to the detailed descriptions and illustrations in my prior U.S. Pat. No. 3,658,347 for an enhanced understanding of the content of FIGS. 4 and 5 hereof, which drawings illustrate a clamp disc 159, a turntable 148 and a coaxially aligned printed circuit motor 141 with a screw mechanism 146, similar to that shown in my prior patent, coupled between the motor and the turntable. The details of the coupling between the turntable and the motor are shown in FIG. 5.

An enclosing pan 140 of a Yaskawa printed circuit motor 141 is mounted to record player bottom pan 60 coaxially of turntable axis 65; see FIG. 4. The motor has a rotor 142 which cooperates with magnets 143 in the motor. The rotor is annular and carries at its inner rim an axially bored hub member 144, the bore of which is threaded to cooperate with mating threads 145 (see FIG. 4) formed on the exterior of a cylindrical coupling member which is in turn axially bored to receive a shaft 147. Rotor hub 144, coupling member 146, shaft 147 and turntable 148 preferably are made of aluminum so as not to interfere with the magnetic circuitry of printed circuit motor 141. Rotor hub 144 is rotatably mounted to motor pan 140 by bearing 149 so that it is only rotatable about axis 65. The turntable has a relatively small diameter, axially bored depending hub 150 (see FIG. 5) in which shaft 147 is received below an enlarged head 151 of the shaft. Shaft head 151 defines a centering spindle for the small diameter center holes of 7 inch, 10 inch and 12 inch phonograph records.

As shown in FIG. 5, the upper end of coupling member 146 defines an upwardly-open annular recess 152 intermediate its inner and outer walls for receiving the lower end of a bias spring 153. Spring 153 cooperates with the lower end of an annular hub of an annular secondary spindle member 154 which is sized to mate within a large diameter center hole of a 7 inch record. The secondary spindle hub mates with the outer diameter of the turntable hub and is urged upwardly along the turntable hub by bias spring 153 toward engagement with the underside of turntable 148 outwardly of the turntable hub. The secondary spindle projects through the turntable at three places; it is rotatable at all times with the turntable and is movable axially relative to the turntable. The inner diameter of bias spring recess 152 in coupling member 146 corresponds to the outer diameter of turntable hub 150. As shown in FIG. 5, shaft 147 is keyed to the turntable hub by a key 155 and is keyed to coupling member 146 by a key 156. Accordingly, coupling member 146, shaft 147, turntable 148 and secondary spindle 154 all rotate as a unit, which unit is rotatable relative to motor rotor hub 144 by virtue of the threaded coupling between the rotor hub and coupling member 146.

As shown in FIG. 5, a finger 157 extends radially beyond the outer diameter of the coupling member at its lower end. This finger is engageable with the lower end of motor rotor hub 144 to define the upper limit of travel of the turntable along its axis 65 relative to the motor rotor hub.

Also as shown in FIG. 4, a clamp disc 159 is rotatably mounted to record player top frame 61 for totation about axis 65 on a vertically disposed axle 160. The clamp disc has limited movement axially along axle 160 and is biased downwardly along the axis by a spring 161; see also FIG. 3. The lower end of axle 160 is recessed, as at 162, so as not to interfere with spindle 151 when the turntable is in its raised position. The clamp disc also has a downwardly facing annular recess 163 concentric to axis 65 so as not to interfere with secondary spindle 154 when a 7 inch record having a large diameter center hole is disposed in the record player. If a 7 inch record having a small diameter center hole (sized to mate with spindle 151) is used in the record player, secondary spindle 154 is forced downwardly relative to the turntable by engagement with the record as the turntable is raised along its axis; in this respect, see the descriptions in my prior U.S. Pat. NO. 3,658,347.

A pair of turntable drag elements 165 are secured to the upper ends of vertically disposed pins 166 which are journalled in the record player bottom pan at diametrically opposed locations about axis 65 within the diameter of turntable 148. The pins are biased upwardly relative to the record player bottom pan by springs 167. The upward limit of travel of the drag elements relative to the record player bottom pan is determined by enlarged heads carried by the lower ends of the pins. The upper limit of travel of pins 166 is defined at a position determined so that, when the turntable is at its uppermost limit of travel along axis 65 (corresponding to the PLAY position of a record supported on the turntable), the drag elements 165 are disengaged from the underside of turntable 148. However, the drag elements contact the underside of the turntable during the major portion of the travel of the turntable away from and back toward its lowermost position which is shown in FIG. 4.

The operational speed of motor 141 is selected by operation of either of speed control buttons 36 or 37 on control panel 14, and is adjustable by use of fine turning rings 42 or 43, as described above. Assume that the turntable is in its lowermost position as shown in FIG. 4 and a record has been inserted into the record player in the manner to be described below. At the appropriate interval in the cycle of operation of the record player, motor 141 is commanded to drive at the appropriate speed in a forward direction. At this time, drag elements 165 engage the underside of turntable 148 and tend to hold the turntable from rotation about axis 65. Motor rotor 142, however, is driven in a forward direction, thereby producing relative rotation between the rotor hub and coupling member 146. Since the connection between the rotor hub and the coupling member is a threaded connection, this relative rotation causes the coupling member, and the unit of which it is a component, to be moved along axis 65 toward clamp disc 159. As the turntable is raised, the drag elements follow and continue to hold the turntable from rotation about axis 65; this condition continues until the drag elements reach their upper limits of travel. Shortly after the turntable moves above the uppermost position of drag elements 165, finger 157 (see FIG. 5) engages the lower end of the motor rotor hub to prevent any further axial motion of the turntable relative to the motor rotor. At this point, the turntable will have lifted from record support arms 190 a record supported by the arms and will have moved the record into contact with the clamp disc and have moved the clamp disc somewhat upwardly against the bias of its bias spring 161. Since the turntable can no longer move axially, it must respond to continued rotation of motor rotor 142 by moving with the rotor about axis 65.

In view of the foregoing description, it will be understood that, as the turntable lifts a record from the support arms and moves it into its playing position (shown in solid lines in FIG. 4 with respect to a 7 inch record), stylus 72 will have been prepositioned at the desired point in its travel radially of axis 65. Thus, play of the record commences immediately upon engagement of the upper surface of the record with the stylus.

The turntable remains at its PLAY position until either an EJECT or STOP command is given to the record player. In response to either of these commands, the operation of turntable drive motor 141 is reversed.

As described in my prior patent, the connection of clamp disc 159 to axle 160 includes an overrunning cluth which permits the clamp disc to rotate about axle 160 only in a direction corresponding to PLAY of the record. Since the clamp disc and the turntable are engaged with record 80 via resilient cushions 168 and 169, respectively, carried by their peripheries, and these cushions have high coefficients of friction relative to the record, the clamp disc cannot respond to reverse rotation of the record. Therefore, through the agency of cushions 168 and 169, the turntable is held sufficiently against rotation in a reverse direction to produce relative rotation between coupling member 146 and motor rotor hub 144. This relative rotation produces downward motion of the turntable along its axis. The initial increment of downward motion of the turntable from its PLAY position is followed by the clamp disc in response to the bias of spring 161 until the underside of the turntable engages the upper surfaces of drag elements 165. Thereafter, the cooperation between the drag elements and the underside of the turntable holds the turntable from reverse rotation while the motor operates in reverse, thereby causing the turntable to be further lowered along its axis back to its lowered position shown in FIG. 4. A suitable limit switch (not shown) senses the turntable in its lowermost position and interrupts the operation of the drive motor at this time. In the course of returning to its lowermost position, the turntable carries record 80 with it and, in the process, replaces the record on support arms 190 which are carried by door 13.

It was noted briefly above that the user of record player 10 normally does not have access to the interior of the record player, and that both insertion of a record into and removal of a record from the record player are accomplished via door 13 at the front of the record player. Door 13 is not manually openable. Instead, it is openable only in response to specific commands given to the record player via control panel 14, i.e., by operation of EJECT button 32. Operation of EJECT button 32, via control system 250 shown in FIG. 9, brings into operation a door drive motor 180 located in the left rear interior corner of the record player, as shown in FIG. 3; see also FIG. 6. As shown best in FIG. 6, motor 180 is coupled to a gear box 181 having an output shaft 182. A crank 183 is connected to the gear box output shaft at one end and is pivotally connected as at 184, at its opposite end to a door drive link 185. Link 185 extends from the vicinity of the left rear corner of the record player to a pivotal connection 186 at its forward end to a bracket 187 which is connected to the frame 188 of door 13. Bracket 187 is connected to the door frame at its left end just to the right of the hinge axis 189 by which the door is mounted to the record player bottom pan 60 and top frame 61, as shown in FIG. 6. Upon the generation of a command to open door 13, door drive motor 180 is operated sufficiently to cause crank 183 to be operated through an arc of 180° from the position shown in FIGS. 3 and 6, thereby to drive the door about hinge axis 189 into its fully open position, as shown in FIG. 7. Upon the generation of a further command to close the door, the drive motor 180 is operated to return the door drive mechanism to the condition shown in FIGS. 3 and 6, thereby to close the door. Suitable limit switches are located within the record player to sense the position of the door drive mechanism in the door-open and door-closed states of this mechanism.

As shown in FIG. 7, a pair of record support arm assemblies 190 are mounted to door 13 and extend from the rear of the door frame 188. When the door is in its closed position, the support arm assemblies are disposed within the record player on either side of turntable axis 65. The support arm assemblies are adjustable for receiving and supporting records of either 7 inch, 10 inch or 12 inch diameter, depending upon which of record size selection controls 33, 34 or 35 has been operated. The details of the record support arm assemblies and their drive mechanism are shown in FIGS. 3, 6, 7 and 8. Each record support arm assembly 190 includes a main arm 191 which has a fixed pivot 192 at its forward end. Pivot connections 192 are defined in the door frame 188 at its left and right ends. The pivot connection associated with the left end of the door is not visible in the plan view of FIG. 7 which shows the door 13 in its fully opened position. Main arms 191 are arranged to carry the principal portion of the weight of a record supported by them; these arms increase in depth proceeding from their unsupported ends towards their pivot connections 192 to door frame 188.

Each record support arm assembly also includes a secondary arm 193 which has a pivotal connection at 194 to the unsupported end of a respective main arm 191, which pivot connections also define a record support point 195. Secondary arms 193 are essentially flat and are arcuately curved to clear turntable 148 when the record support arm assemblies are positioned for support of a 7 inch record. A 7 inch record is represented in FIGS. 3 and 7 by broken line 196, and broken lines 197 and 198 represent 10 inch and 12 inch diameter records, respectively (In FIG. 14, broken line 199 represents the run-out of a 7, 10 or 12 inch record, broken line 200 represents the label area of all records, broken line 201 represents the large diameter center hole for a 7 inch record, and broken line 202 represents a small diameter center hole for either a 7 inch, 10 inch or 12 inch record.) Record support secondary arms 193 have a floating pivotal connection 203 at their forward ends to respective ones of adjustably positionable support members 204 (see FIGS. 3, 7 and 8). Secondary arms 193 are each biased into engagement with the respective support members 204 by tension springs 205 which are coupled between the support members and the secondary arms. Slightly forwardly of the mid-length of each secondary arm, it carries an assembly which defines a second record support point 206. Thus, each record support arm assembly 190 defines two record support points, 195 and 206. The several record support points cooperating to define a stable mechanism for support of a record of selected size in the record player. It will be observed that record support points 195 and 206, respectively, are disposed to the rear of and forwardly of a line through axis 65 parallel to door frame 188 when the door is closed.

A pair of identically threaded screw shafts 207 and 208 are rotatably carried by the door frame 188 and are associated with the left half and right half of the door, respectively, as shown in FIG. 7. The screw shafts are parallel to each other. Screw shaft 207 is disposed adjacent to the upper edge of the door frame as shown in FIG. 8, whereas screw shaft 208 is disposed at a lower elevation on the door frame. The screw shafts are rotatably supported at their opposite ends. At the adjacent ends of the shafts at the center of the door, each of the shafts carries a gear 209. Gears 209 are meshed with each other and are identical. Upon rotation of screw shaft 207, which is driven in the manner described below, shaft 208 is caused to rotate at the same rate but in the opposite direction. Support members 204 for the secondary record support arms 193 are threadably engaged with and supported on respective ones of screw shafts 207 and 208. When the screw shafts are rotated, the support members 204 are driven toward and away from each other in synchronism symmetrically with respect to the center of door 13. In this manner the relative positions of the left and right record support points are adjusted.

Screw shafts 207 and 208 are rotated to adjust the position of record support arm assemblies 190 only when door 13 is in its open position. Accordingly, it is not necessary that the coupling of the record size drive mechanism, of which screw shafts 207 and 208 are a part, be operable when the door is in my position other than its fully open position. Therefore, a gear 210 is affixed to the extreme left end of screw shaft 207, as shown in FIG. 3 in association with the left front corner of record player 10. FIG. 3 shows the door in its fully closed position. When the door is moved to its fully opened position by operation of door drive motor 180 in the manner described above, gear 210 is moved into mesh with a second gear 211 which is disposed to the rear door pivot 189 and which rotates about a fixed axis perpendicular to the closed position of the door. Gear 211 is mounted on the end of a flexible drive shaft 212. The end of the flexible drive shaft adjacent gear 211 is held in fixed relation to record player top frame 61 by a suitable mount 213 which is secured to the underside of top frame 61 in the vicinity of the structure which defines door pivot 189. The other end of flexible shaft 212 is connected to a door drive motor 214 which is disposed in the right gear interior corner of the record player, as shown in FIG. 3. Gears 210 and 211 mesh with each other when door 13 is in its fully open position. Motor 214 is regulated by suitable interlocks to operate only when the door is open.

The pivotal connection 203 of the secondary arms 193 of the record support arm assemblies to support blocks 204 is a connection which is floating in a direction perpendicular to the elongate extent of the door frame. This connection must be a floating connection since the forward ends of secondary arms 193 must be able to follow the contour of the detenting cams which are associated with each secondary arm 193. Each record support arm assembly has associated with it a 7 inch record positioning detent cam 216 and similar positioning detent cams 217 and 218 which define the 10 inch and 12 inch record supporting positions of secondary arms 193. Cams 216 and 218 are of similar configuration. Cams 216, 217 and 218, as shown in FIG. 8, are secured to a flange 219 which extends rearwardly from door frame 188 substantially along its entire length. As shown in FIG. 7, detent cams 216 are located adjacent to the center of door 13, whereas cams 217 and 218 are located closer to main arm pivot points 192. Each of the detent cams on the left side of door 13 has associated with it a respective one of switches 220, 221 and 222.

The pivotal connection of each record support secondary arm 193 to its associated support member 204 is defined by a reduced diameter upper end 223 of a pin 224 above the support arm. Pins 223 are carried by arms 193. The major portion of each pin 223 is disposed below the corresponding support arm and at its lower end carries a cam follower roller 225. The extreme forward end of each secondary support arm 193 is supported on a bottom surface 226 of a rearwardly opening recess 227 formed in a rear portion of each support member 204. As shown in FIG. 3, head 223 of each pin 224 cooperates with an upper portion of this recess which is contoured to permit the head to move in the recess only in a direction toward and away from the door frame. Springs 205 urge the respective support arms toward the door frame to maintain the forward ends of the support arms engaged in recesses 227 and to continually urge cam follower rollers toward door frame flange 219.

Assume that door 13 is in its fully open position and a command is given to the record player, via one of control buttons 33, 34, or 35, to adjust the record player to accept a record of a size different from the last record received. In response to such a command, motor 214 is operated to cause gear 210 to be driven, via flexible shaft 212 and gear 211 which then meshes with gear 210, to rotate screw shafts 207 and 208 in an appropriate direction. Support members 204 are driven toward or away from each other, carrying the inner ends of secondary support arms 193 with them by virtue of the previously described coupling of arms 193 to support members 204. As such motion occurs, cam follower rollers 225 follow along cams 218, 217, or 216 until the roller is engaged with the cams associated with the record size which has been selected. Proper registry of the cam rollers with the corresponding detent cams is sensed by that one of switches 220, 221 or 222 which corresponds to the size of the record selected. Upon registry of the cam rollers with the appropriate pair of cam members, the appropriate switch senses this fact and generates a signal which instructs the drive motor to cease its operation. The record support arm assemblies 190 have thereby been adjusted to assume the appropriate configuration for receipt of a record of the size commanded by the operation of the control panel.

From the foregoing description, it is apparent that record player 10 includes means for receiving a record of any size desired, for supporting the record on the openable door of the record player, and for causing a received record to be moved into position in alignment with turntable axis 65 upon closure of the door. By virtue of the overall control system 250, illustrated generally in FIG. 9, door 13 is capable of moving between its open and closed position only when turntable 148 is at its lowered position along its axis of rotation. In the course of movement of the turntable from is lowered to its playing position, it passes through the position of a record supported on record support arm assemblies 190 and lifts the record from support points 195 and 206. In the course of moving from its playing position to its retracted position, the turntable replaces a supported record on the record support arm assemblies.

FIG. 9 is a simplified overall block diagram of a programmable control system 250 for record player 10 as described above.

System 250 includes various individual components and subsystems. A master control subsystem 251 is composed of a central processor unit 252, an internal clock module 253, and a control module 254. A stylus positioning subsystem 256 includes stepping motor 121 and stylus lift solenoid 30. A keyboard scanning subsystem 257 is associated with sections 21, 22, and 23 of control panel 14. A door and record size control subsystem 258 is represented functionally in FIG. 9 by blocks 259 and 260 associated with drive motors 180 and 210, respectively. A display subsystem 261 with which digital display section 24 of control panel 14 is intimately associated is a further aspect of overall control system 250, as is a real-time clock subsystem 263. Additionally, overall control system 250, as represented in FIG. 9, includes a turntable control subsystem 264, a readonly memory 265, a random-access memory 266, and magnetic record subsystem 230 not here relevant.

The basic element of overall control system 250 is central processor unit 252. Preferably, this unit is defined by an INTEL 8080 microprocessor with which is associated, in a conventional manner, an internal clock circuit module 253 and a control module 254. The control module preferably is an INTEL 8228 integrated circuit which is coupled to the microprocessor. The central processing unit has associated with it a 16 lead address bus 268. Control module 254 provides an 8 lead data bus 269, and a 5 lead control bus 270 of which 4 leads are active. The address, data and control buses are unified in the representation of FIG. 9 into a bus trunk 271 to which the remaining subsystems of system 250 are appropriately connected. Internal clock module 253 provides two separate clocking pulse trains which each have a frequency of 2 m Hz.

The details of various ones of the subsystems of control system 250, as illustrated in FIG. 9, are set forth in FIGS. 4–11 at pages 24 through 27 of the previously cited article in INTERFACE AGE, May 1977, concerning record player 10.

It will be appreciated that the foregoing description has been presented with reference to a presently preferred embodiment of this invention and to certain selected alternative embodiments of certain aspects of this invention. The preceding descriptions have been set forth by way of example, not as an exhaustive treatise or catalog of all forms which this invention may take. Accordingly, workers skilled in the art or arts to which this invention pertains will readily recognize that alterations, variations or modifications on the structures, arrangements and systems described above may be made without departing from the scope of this invention, and that the following claims are not to be interpreted as pertaining only to the specific arrangements, structures and procedures described above.

What is claimed is:

1. A record player in which a phonograph record disc is supported in a playing position on a turntable rotatably drivable at a selected speed about an axis, the disc in its playing position being engageable with a stylus supported by a transducer cartridge held in a carriage which is movable along a line radially of the turntable above the turntable in response to tracking engagement of the stylus in the spiral groove of the disc, the turntable is movable along said axis into and out of a playing position thereof, and the turntable and the carriage are disposed in an enclosing housing, and characterized in that the housing includes a door which is closed when the turntable is in its playing position, the door includes means accessible in an open position of the door for receiving and supporting a record and for disposing a supported record between the turntable and the carriage coaxially above the turntable in the closed position of the door and means interrelating movement of the turntable along said axis and the position of the door.

2. A record player according to claim 1 including means for adjusting the record receiving and supporting means for receiving and supporting at different times records of different diameter.

3. A record player according to claim 2 inlucing selectively operable drive means for operating the adjusting means.

4. A record player according to claim 3 wherein the drive means are operable when the door is in its open position.

5. A record player according to claim 1 including power means operable for moving the door between its open and closed positions.

* * * * *